United States Patent
Yamashita et al.

(10) Patent No.: US 9,566,843 B2
(45) Date of Patent: Feb. 14, 2017

(54) DOUBLE-SHAFT DAMPER ASSEMBLY FOR VEHICLE AIR CONDITIONING APPARATUS

(75) Inventors: Tsubasa Yamashita, Tokyo (JP); Isami Yoneda, Tokyo (JP); Takahiro Sasaki, Tokyo (JP); Junichiro Hara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 961 days.

(21) Appl. No.: 13/146,068

(22) PCT Filed: Jul. 20, 2010

(86) PCT No.: PCT/JP2010/062142
§ 371 (c)(1),
(2), (4) Date: Jul. 25, 2011

(87) PCT Pub. No.: WO2011/010628
PCT Pub. Date: Jan. 27, 2011

(65) Prior Publication Data
US 2011/0284183 A1    Nov. 24, 2011

(30) Foreign Application Priority Data
Jul. 23, 2009   (JP) .................................. 2009-172251

(51) Int. Cl.
*B60H 3/00* (2006.01)
*B60H 1/00* (2006.01)

(52) U.S. Cl.
CPC ..... *B60H 1/00678* (2013.01); *B60H 2001/007* (2013.01); *B60H 2001/00707* (2013.01)

(58) Field of Classification Search
CPC ............ B60H 1/00064; B60H 1/00664; B60H 1/00678; B60H 2001/00092; B60H 2001/00664; B60H 2001/00707; B60H 2001/00714; B60H 2001/00721
(Continued)

(56) References Cited

U.S. PATENT DOCUMENTS 4,216,822 A * 8/1980 Izumi ............................. 165/42
4,420,115 A * 12/1983 Matsushima et al. ... 237/12.3 A
(Continued)

FOREIGN PATENT DOCUMENTS

DE    10 2004 020 565 A1    12/2004
DE    10 2007 026 620 A1    12/2007
(Continued)

OTHER PUBLICATIONS

Communication under Rule 71(3) EPC dated Jul. 11, 2013, issued in corresponding European Patent Application No. 10802248A (7 pages).
(Continued)

*Primary Examiner* — Travis Ruby
(74) *Attorney, Agent, or Firm* — Westerman, Hattori, Daniels & Adrian, LLP

(57) ABSTRACT

In a vehicle air conditioning apparatus in which a plurality of air mixing dampers that are driven independently of each other have a drive shaft having a double-shaft structure. A hollow drive shaft of one damper is penetrated by a solid drive shaft of another damper. A first shaft-center immobilizing mechanism that secures a shaft center of the hollow drive shaft is provided between a side surface of the unit casing, to which the drive shaft having the double-shaft structure is supported in a freely rotatable manner. And a gear provided at a shaft end of the hollow drive shaft.

4 Claims, 13 Drawing Sheets

(58) Field of Classification Search
USPC .......... 165/42, 202, 203; 454/333, 145, 156; 137/601.01–601.19
See application file for complete search history.

(56) References Cited

U.S. PATENT DOCUMENTS

| | | | |
|---|---|---|---|
| 6,047,951 A | | 4/2000 | Ito et al. |
| 6,089,972 A * | | 7/2000 | Gunji et al. ................ 454/233 |
| 6,419,206 B1 * | | 7/2002 | Wakamatu et al. .......... 251/308 |
| 6,726,366 B2 * | | 4/2004 | Grimke ........................ 384/129 |
| 6,814,137 B2 * | | 11/2004 | Tsurushima et al. ........ 165/202 |
| 2001/0004015 A1 | | 6/2001 | Bendell et al. |
| 2005/0227606 A1 * | | 10/2005 | Oide ............................ 454/108 |
| 2007/0293135 A1 | | 12/2007 | Hori et al. |
| 2008/0292462 A1 | | 11/2008 | Munch |
| 2010/0120348 A1 | | 5/2010 | Tanaka et al. |

FOREIGN PATENT DOCUMENTS

| | | |
|---|---|---|
| EP | 1 024 041 A1 | 8/2000 |
| JP | 6-48366 U | 6/1994 |
| JP | 11-180129 A | 7/1999 |
| JP | 2000-185543 A | 7/2000 |
| JP | 2002-211228 A | 7/2002 |
| JP | 2004-330961 A | 11/2004 |
| JP | 2006-111119 A | 4/2006 |
| JP | 2007-320514 A | 12/2007 |
| JP | 2008-100630 A | 5/2008 |
| JP | 2008-265437 A | 11/2008 |
| WO | 2008/130038 A1 | 10/2008 |

OTHER PUBLICATIONS

International Search Report of PCT/JP2010/062142, mailing date of Aug. 17, 2010.

Extended European Search Report dated Jan. 30, 2013, issued in corresponding European Patent Application No. 10802248.4.

Japanese Decision to Grant a Patent dated Jan. 7, 2014, issued in corresponding Japanese Patent Application No. 2009-172251 (3 pages). Explanation of Relevancy—"The Decision to Grant a Patent has been received."

* cited by examiner

FIG. 11A
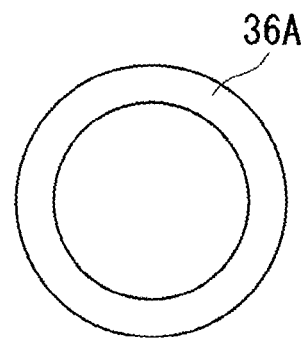
FIG. 11B
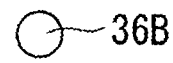
FIG. 11C
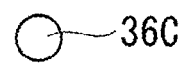

DOUBLE-SHAFT DAMPER ASSEMBLY FOR VEHICLE AIR CONDITIONING APPARATUS

TECHNICAL FIELD

The present invention relates to a multi-zone type vehicle air conditioning apparatus that is capable of providing independent air conditioning to a driver's seat and a passenger seat at the front-seat side and to a right seat and a left seat at the rear-seat side.

BACKGROUND ART

As one example of a multi-zone type vehicle air conditioning apparatus (HVAC: Heating Ventilation and Air conditioning Unit) by which the temperature can be independently controlled for a driver's seat and a passenger seat at the front-seat side and a right seat and a left seat at the rear-seat side, Patent Literatures 1 and 2 disclose one in which an air channel on a downstream side of an evaporator in an HVAC is divided into four channels with partitioning plates; an independently driven air-mixing damper is provided in each channel; and air-conditioned air whose temperature is separately controlled is guided through individual ducts to a face vent channel and a foot vent channel at the front-seat side and to a face vent channel and a foot vent channel at the rear-seat side.

In addition, a damper-driving structure for a vehicle air conditioning apparatus is disclosed in, for example, Patent Literature 3, in which a pair of left and right air-mixing dampers are installed, in a freely pivotable manner, with partitioning plates therebetween that divide an air channel into a plurality of channels, and the individual air-mixing dampers are disposed on a single axis so that they can be separately driven from one side by two electrically powered actuators via a drive shaft having a double-shaft structure.

CITATION LIST

Patent Literature

{PTL 1} Japanese Unexamined Patent Application, Publication No. 2002-211228.
{PTL 2} Japanese Unexamined Patent Application, Publication No. 2008-100630.
{PTL 3} Japanese Unexamined Utility Model Application, Publication No. Hei 6-48366.

SUMMARY OF INVENTION

Technical Problem

In a multi-zone type vehicle air conditioning apparatus, a drive shaft having a double-shaft structure in which a solid drive shaft of one damper passes through a hollow drive shaft of another damper is employed, as disclosed in Patent Literature 3, in order to independently drive a plurality of air-mixing dampers; however, shaft centers of the hollow drive shaft and the solid drive shaft are not necessarily securely supported, and one drive shaft acts as a bearing for the other drive shaft. Accordingly, clearances between shafts or at a bearing portion cause the shaft centers thereof to shift; rattling thereof causes rotational errors and mutual interference between the drive shafts, which result in problems such as an increase in driving torque, deterioration in temperature control performance, etc.; and these have been factors that cause a loss of controllability of the air-mixing dampers, an increase in size of the damper-driving actuators, etc.

The present invention has been conceived in light of such circumstances, and an object thereof is to provide a vehicle air conditioning apparatus that is capable of preventing shifting of the shaft center of a drive shaft having a double-shaft structure that independently drives a plurality of air-mixing dampers, and that is capable of preventing associated deterioration of temperature control performance, an increase in driving torque, etc.

Solution to Problem

In order to solve the above-described problems, a vehicle air conditioning apparatus of the present invention employs the following solutions.

Specifically, a vehicle air conditioning apparatus according to a first aspect of the present invention is a vehicle air conditioning apparatus in which a plurality of air mixing dampers that are driven independently of each other and that adjust the ratio of airflow volume circulated in a channel that bypasses a heater and a heating channel that flows via the heater are provided in a plurality of air channels partitioned by partitioning plates downstream of an evaporator, wherein the air mixing dampers have a drive shaft having a double-shaft structure, in which a hollow drive shaft of one damper is penetrated by a solid drive shaft of another damper, and the air mixing dampers can be individually driven via a gear provided at a shaft end of each drive shaft, the vehicle air conditioning apparatus including a first shaft-center immobilizing mechanism that secures a shaft center of the hollow drive shaft and that is provided between a side surface of a unit casing, to which the drive shaft having the double-shaft structure is supported in a freely rotatable manner, and the gear provided at the shaft end of the hollow drive shaft.

The first aspect of the present invention is a vehicle air conditioning apparatus in which the plurality of air mixing dampers that are driven independently of each other have the drive shaft having a double-shaft structure, wherein the hollow drive shaft of one damper is penetrated by the solid drive shaft of another damper, and in which the first shaft-center immobilizing mechanism that secures the shaft center of the hollow drive shaft is provided between the side surface of the unit casing, to which the drive shaft having the double-shaft structure is supported in a freely rotatable manner, and the gear provided at a shaft end of the hollow drive shaft; therefore, shifting of the shaft center of the hollow drive shaft can be prevented by supporting the shaft center of the hollow drive shaft by securing it to the unit casing via the first shaft-center immobilizing mechanism. Accordingly, rotational errors and mutual interference of the drive shafts due to rattling thereof and associated deterioration in temperature control performance, an increase in driving torque, etc. can be prevented; size reduction and cost reduction of the actuators for driving the dampers can be achieved; and the controllability of the air mixing dampers can also be improved. Note that, in the present invention, a solid drive shaft refers to a shaft on the center side of the double shaft, and it does not relate to whether or not the shaft itself is solid.

Furthermore, in the vehicle air conditioning apparatus according to the first aspect of the present invention, it is preferable that the first shaft-center immobilizing mechanism be formed of a guide member, which is provided at one of the side surface of the unit casing and a side surface of the gear, and a ring groove provided at the other, to which the guide member is fitted in a freely slidable manner.

With this configuration, because the first shaft-center immobilizing mechanism is formed of the guide member, which is provided at one of the side surface of the unit casing and the side surface of the gear, and the ring groove provided at the other, to which the guide member is fitted in a freely slidable manner, the guide member provided. At one of the side surface of the unit casing and the side surface of the gear is fitted to the ring groove provided at the other, thereby restraining the position of the gear, and thus, it is possible to prevent shifting of the shaft center of the hollow drive shaft in which the gear is provided. Therefore, by merely providing the guide member and the ring groove, rotational errors and mutual interference of the drive shafts due to rattling thereof and the associated deterioration in temperature control performance, an increase in driving torque, etc. can be easily and reliably prevented.

Furthermore, in the vehicle air conditioning apparatus according to the first aspect of the present invention, it is preferable that the guide member and/or the ring groove be integrally molded on the side surface of the unit casing and/or the side surface of the gear.

With this configuration, because the guide member and/or the ring groove are/is integrally molded at the side surface of the unit casing and/or the side surface of the gear, the first shaft-center immobilizing mechanism that secures the shaft center of the hollow drive shaft can be easily formed by modifying the existing parts without adding new parts. Therefore, it is possible to prevent an increase in costs caused by providing a shaft-center immobilizing mechanism.

Furthermore, a vehicle air conditioning apparatus according to a second aspect of the present invention is a vehicle air conditioning apparatus in which a plurality of air mixing dampers that are driven independently of each other and that adjust the ratio of airflow volume circulated in a channel that bypasses a heater and a heating channel that flows via the heater are provided in a plurality of air channels partitioned by partitioning plates downstream of an evaporator, wherein the air mixing dampers have a drive shaft having a double-shaft structure, in which a hollow drive shaft of one damper is penetrated by a solid drive shaft of another damper, and the air mixing dampers can be individually driven via a gear provided at a shaft end of each drive shaft, the vehicle air conditioning apparatus including a second shaft-center immobilizing mechanism that secures shaft center of the solid drive shaft and that is provided at the shaft end of the solid drive shaft which is a drive shaft having the double-shaft structure.

The second aspect of the present invention is a vehicle air conditioning apparatus in which the plurality of air mixing dampers that are driven independently of each other have the drive shaft having a double-shaft structure, wherein the hollow drive shaft of one damper is penetrated by the solid drive shaft of another damper, and in which the second shaft-center immobilizing mechanism that secures the shaft center of the solid drive shaft is provided at the shaft end of the solid drive shaft, which is the drive shaft having the double-shaft structure; therefore, shifting of the shaft center of the solid drive shaft can be prevented by supporting and securing the shaft center of the solid drive shaft via the second shaft-center immobilizing mechanism. Accordingly, rotational errors and mutual interference of the drive shafts due to rattling thereof and the associated deterioration in temperature control performance, an increase in driving torque, etc. can be prevented; size reduction and cost reduction of the actuators for driving the dampers can be achieved; and the controllability of the air mixing dampers can also be improved.

Furthermore, in the vehicle air conditioning apparatus according to the second aspect of the present invention, it is preferable that the second shaft-center immobilizing mechanism be formed of a support member, which is secured on the side surface of the unit casing, and a securing guide that is provided at the support member and that supports and restrains the shaft center of the solid drive shaft.

With this configuration, because the second shaft-center immobilizing mechanism is formed of the guide member secured at the side surface of the unit casing and the securing guide that is provided at the support member and that supports and restrains the shaft center of the solid drive shaft, it is possible to prevent shifting of the shaft center of the solid drive shaft by supporting and restraining the shaft center of the solid drive shaft via the securing guide provided at the support member which is secured on the unit casing side. Therefore, by merely providing the support member and the securing guide, rotational errors and mutual interference of the drive shafts due to rattling thereof and the associated deterioration in temperature control performance, an increase in driving torque, etc. can be reliably prevented with a simple and low-cost structure.

Furthermore, in the vehicle air conditioning apparatus according to the first aspect or the second aspect of the present invention, it is preferable that a bearing portion of the partitioning plate that supports the drive shaft having the double-shaft structure in a freely rotatable manner be configured to support a shaft end of the hollow drive shaft.

With this configuration, because the bearing portion of the partitioning plate that support the drive shaft having the double-shaft structure in a freely rotatable manner support the shaft end of the hollow drive shaft, the shaft end of the hollow drive shaft on the partitioning plate side can be supported with the bearing portion provided at the partitioning plate, and the solid drive shaft on the interior side of the hollow drive shaft can be supported via the hollow drive shaft. Therefore, shifting of the shaft centers can also be prevented at the partitioning plate side of the hollow drive shaft and the solid drive shaft of the double-shaft structure; rotational errors of the drive shaft having the double-shaft structure, mutual interference of the drive shafts, and the associated deterioration in temperature control performance, an increase in driving torque, etc. can be prevented; size reduction and cost reduction of the actuators for driving the dampers can be achieved; and the controllability of the air mixing dampers can also be improved.

Furthermore, in the vehicle air conditioning apparatus according to the first aspect or the second aspect of the present invention, it is preferable that the drive shaft having the double-shaft structure be mutually supported in sliding contact via ribs provided at least three locations at an inner circumference of the hollow drive shaft or an outer circumference of the solid drive shaft.

With this configuration, the drive shafts in the double-shaft structure are mutually supported in sliding contact via the ribs that are provided at least three locations at one of the inner circumference of the hollow drive shaft and the outer circumference of the solid drive shaft; therefore, rattling thereof can be reduced by making the clearance between the shafts smaller and the sliding-contact friction can also be reduced. Accordingly, the controllability of the air mixing dampers can be further improved, and the drive torque thereof can also be reduced.

Advantageous Effects of Invention

With the vehicle air conditioning apparatus of the present invention, the shaft center of the hollow drive shaft can be prevented from shifting by supporting the shaft center of the hollow drive shaft by securing it to the unit casing via the first shaft-center immobilizing mechanism; therefore, rotational errors and mutual interference of the drive shafts due to rattling thereof and the associated deterioration in temperature control performance, an increase in driving torque, etc. can be prevented; size reduction and cost reduction of the actuators for driving the dampers can be achieved; and the controllability of the air mixing dampers can also be improved.

In addition, with the vehicle air conditioning apparatus of the present invention, the shaft center of the solid drive shaft can be prevented from shifting by supporting the shaft center of the solid drive shaft by securing it to the unit casing via the second shaft-center immobilizing mechanism; therefore, rotational errors and mutual interference of the drive shafts due to rattling thereof and the associated deterioration in temperature control performance, an increase in driving torque, etc. can be prevented; size reduction and cost reduction of the actuators for driving the dampers can be achieved; and the controllability of the air mixing dampers can also be improved.

BRIEF DESCRIPTION OF DRAWINGS

FIG. 11A is a front view of a guide member that restrains the gear shown in FIG. 10B.

FIG. 11B is a front view of the guide member that restrains the gear shown in FIG. 10B.

FIG. 11C is a front view of the guide member that restrains the gear shown in FIG. 10B.

DESCRIPTION OF EMBODIMENTS

Embodiments of the present invention will be described below with reference to the drawings.

First Embodiment

A first embodiment of the present invention will be described below, using FIGS. 1 to 12.

A vehicle air conditioning apparatus (HVAC: Heating Ventilation and Air conditioning Unit) 1 of this embodiment is disposed at substantially the center portion of an instrument panel at a front portion of a vehicle cabin so as to circulate an airflow in a front-to-rear direction of the vehicle. A blower unit 2 that takes in external air or air in the vehicle cabin and supplies it to the HVAC 1 is connected at an upstream side of the HVAC 1. The blower unit 2 is normally disposed on the passenger seat side (left side of the HVAC 1 in the case of a right-hand-drive vehicle, and right side of the HVAC 1 in the case of a left-hand-drive vehicle) and blows out the air laterally relative to the HVAC 1.

Figure 4:
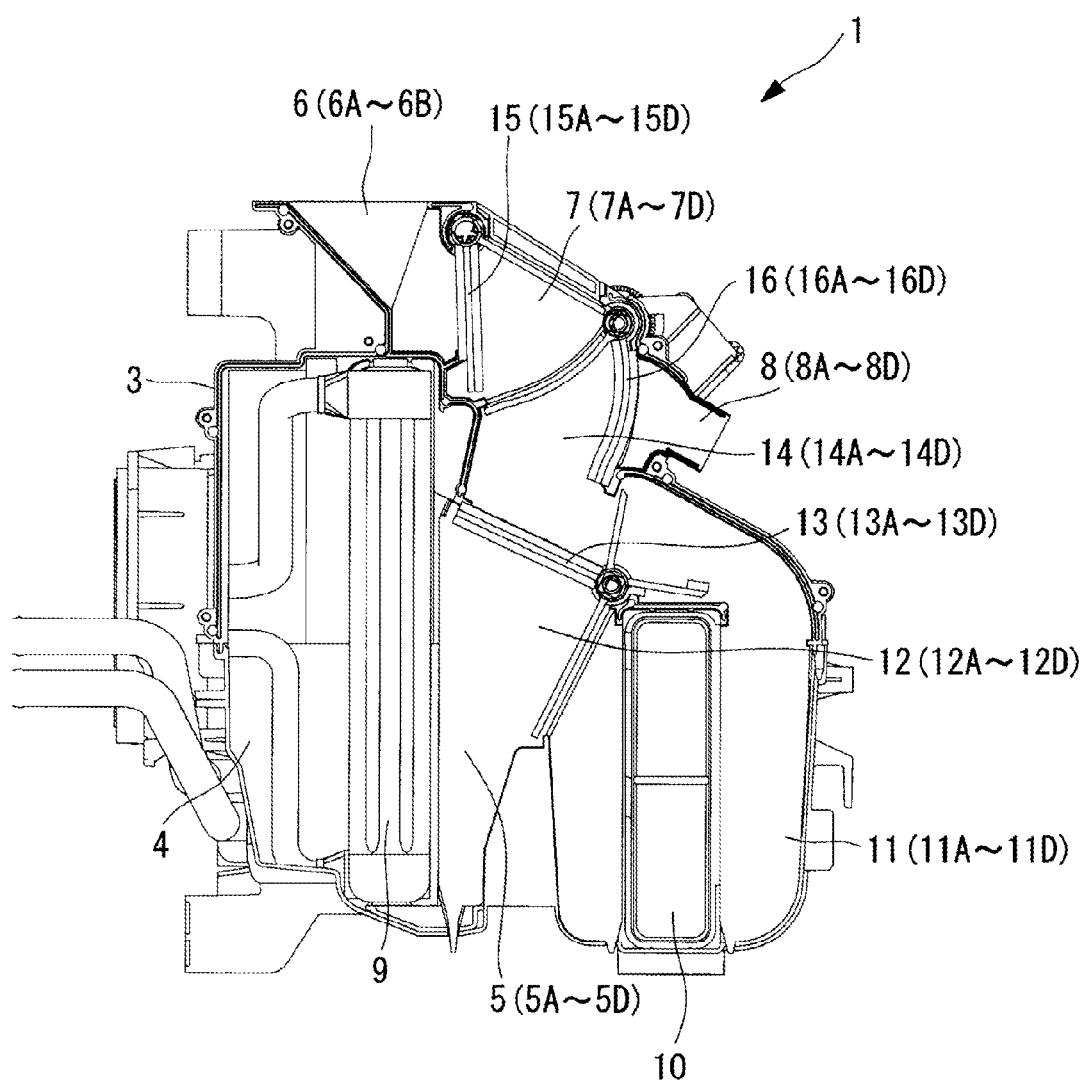
FIG. 4 is an internal structural view of the vehicle air conditioning apparatus shown in FIG. 1 along an airflow direction.

The HVAC 1 is provided with a unit casing 3 formed by assembling a casing molded as a plurality of divided parts into a single unit. As shown in FIG. 4, an opening 4 to which the blower unit 2 is connected is formed at the upstream portion of the unit casing 3, inside of which is formed an air channel 5 that connects to a DEF vent channel 6, a face vent channel 7, and a foot vent channel 8. In, the air channel 5, an evaporator 9 that forms a refrigeration cycle (not shown) and in which a refrigerant is circulated is disposed immediately after the opening 4 so that the air being sent from the blower unit 2 can be cooled through heat exchange with the refrigerant.

At a downstream side of the evaporator 9, the air channel 5 is divided into a heating channel 11 in which a heater core 10, through which engine cooling water is circulated, is disposed and a bypass channel 12 that bypasses the heater core 10, and airflows circulate through these channels 11 and 12 at a flow-volume ratio adjusted by an air-mixing damper 13 provided at a branching portion. The heating channel 11 and the bypass channel 12 join at an air mixing region 14 downstream of the air-mixing damper 13, and subsequently, via the air-mixing region 14, connect to the DEF vent channel 6, the face vent channel 7, and the foot vent channel 8 downstream thereof.

A DEF/face damper 15 that opens and closes the DEF vent channel 6 and the face vent channel 7 is provided between the DEF vent channel 6 and the face vent channel 7 in a freely pivotable manner, and a foot damper 16 that opens and closes the foot-vent channel 8 and the channel toward the DEF vent channel 6 and the face vent channel 7 is provided at an inlet portion of the foot vent channel 8 in a freely pivotable manner. The above configuration is substantially equivalent to the configuration of a typical single-zone type HVAC that performs air conditioning for the front-seat side (driver's seat and passenger seat), and there is no particular difference therefrom.

In this embodiment, three partitioning plates 17A, 17B, and 17C are provided at the downstream side of the evaporator 9 in the air channel 5 in the longitudinal direction along the air-circulating direction to divide the air channel 5 on the downstream side of the evaporator 9 into four air channels 5A, 5B, 5C, and 5D. Accordingly, the heating channel 11, the bypass channel 12, the air mixing region 14, the face vent channel 7, and the foot vent channel 8 formed at the downstream side of the evaporator 9 in the air channel 5 are also divided into four channels each, that is, heating channels 11A to 11D, bypass channels 12A to 12D, air-mixing regions 14A to 14D, face vent channels 7A to 7D, and foot vent channels 8A to 8D. Note that there is no particular need to divide the DEF vent channel 6 into four channels, and, in this case, the DEF vent channel 6 is divided into two, that is, left and right, channels 6A and 6B.

With the air channel 5 divided into four air channels 5A, 5B, 5C, and 5D, the two channels 5A and 5B at center portions are channels for a right seat and a left seat at the rear-seat side, and the two channels 5C and 5D at both side portions are channels for the driver's seat and the passenger seat at the front-seat side. The downstream sides of the air channels 5A, 5B, 5C, and 5D are connected, in four separate channels, to the face vent channels 7A to 7D and the foot vent channels 8A to 8D. In these four channels, assuming openings of air channels that are connected to vents provided for the driver's seat and the passenger seat to be A and openings of air channels that are connected to vents provided for the right seat and the left seat at the rear-seat side to be B, their sizes are set to be A>B (see FIGS. 3 and 5).

Specifically, when the sizes of the channel openings A and B of the face vent channels 7A to 7D and the foot vent channels 8A to 8D, which are divided into four channels, are compared in terms of the ratio of the channel-cross-sectional areas, the ratio thereof is approximately A:B=6:4. In addition, when the comparison is made in terms of the ratio of the flow-volume-distribution for the airflow, the ratio is approximately A:B=7:3, so that a greater amount of airflow can be made to flow to the driver's seat and the passenger seat at the front-seat side as compared with the right seat and the left seat of the rear seats.

By dividing the air channel 5 into four channels at the downstream side of the evaporator 9, the air mixing damper 13, the DEF/face damper 15, and the foot damper 16 are also divided into four parts, respectively, that is, air-mixing dampers 13A to 13D, DEF/face dampers 15A to 15D, and foot dampers 16A to 16D, corresponding to each channel. The DEF/face dampers 15A to 15D and the foot dampers 16A to 16D open and close in an interlocked fashion with each other, as is commonly known, and any blowout mode, such as a DEF mode, a face mode, a foot mode, a bi-level mode, a DEF/foot mode, etc. can be selected. Note that, with regard to the foot dampers 16A to 16D, the face mode, the bi-level mode, and the foot mode can be independently selected for the four channels.

In addition, the air mixing dampers 13 provided at the four air channels 5A to 5D can be independently driven via a driving mechanism, described later, and, accordingly, it is possible to separately adjust the temperature of the airflows that blow into the vehicle cabin, via the channels, from face vents 22A, 22B, 22C, 22D, 24A, and 24B and foot vents 26A, 26B, 28A, and 28B, described later, provided in correspondence with the four seats at the left and right at the front and rear sides.

Figure 1:
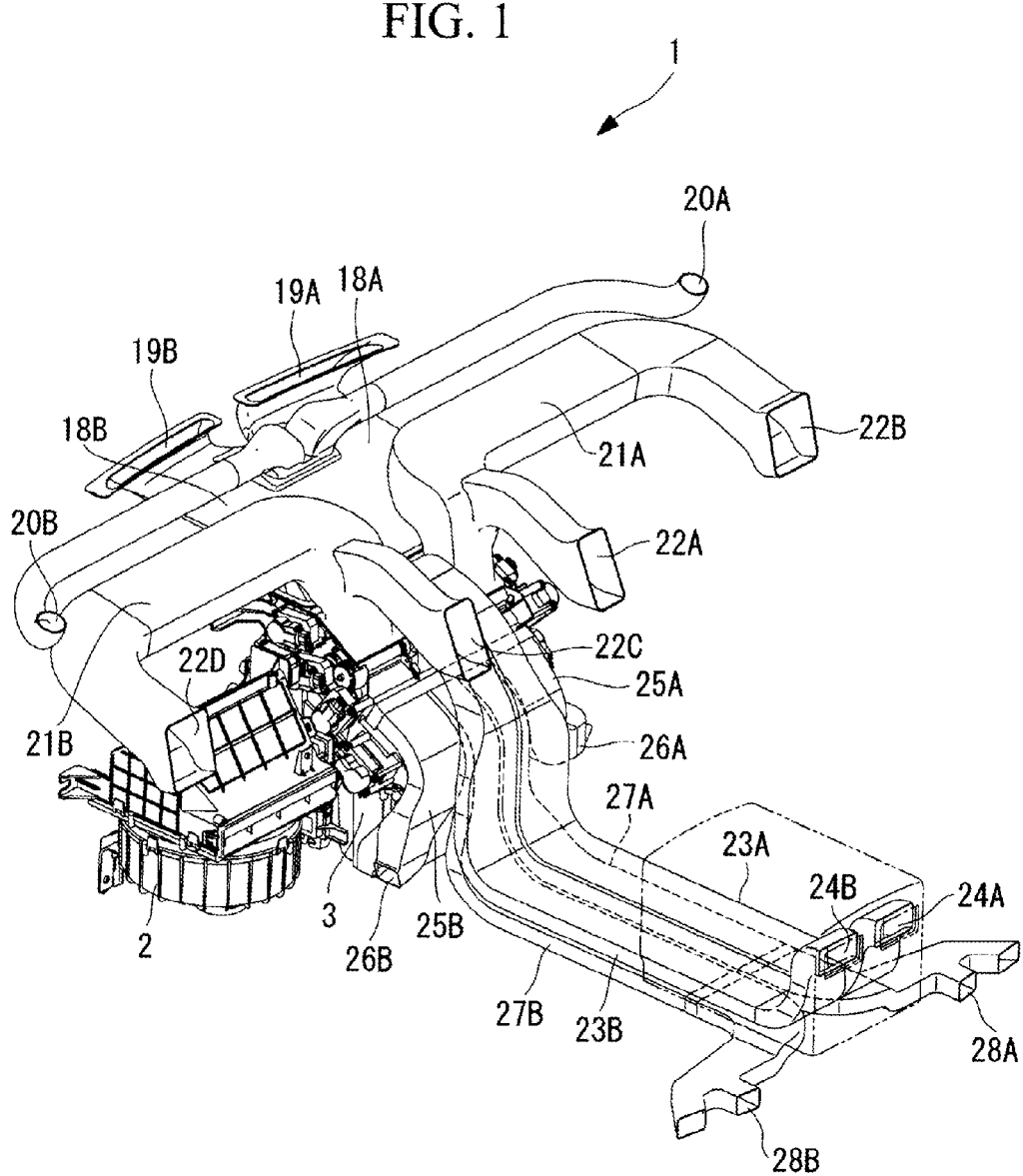
FIG. 1 is a perspective view of a vehicle air conditioning apparatus according to a first embodiment of the present invention.
Figure 2:
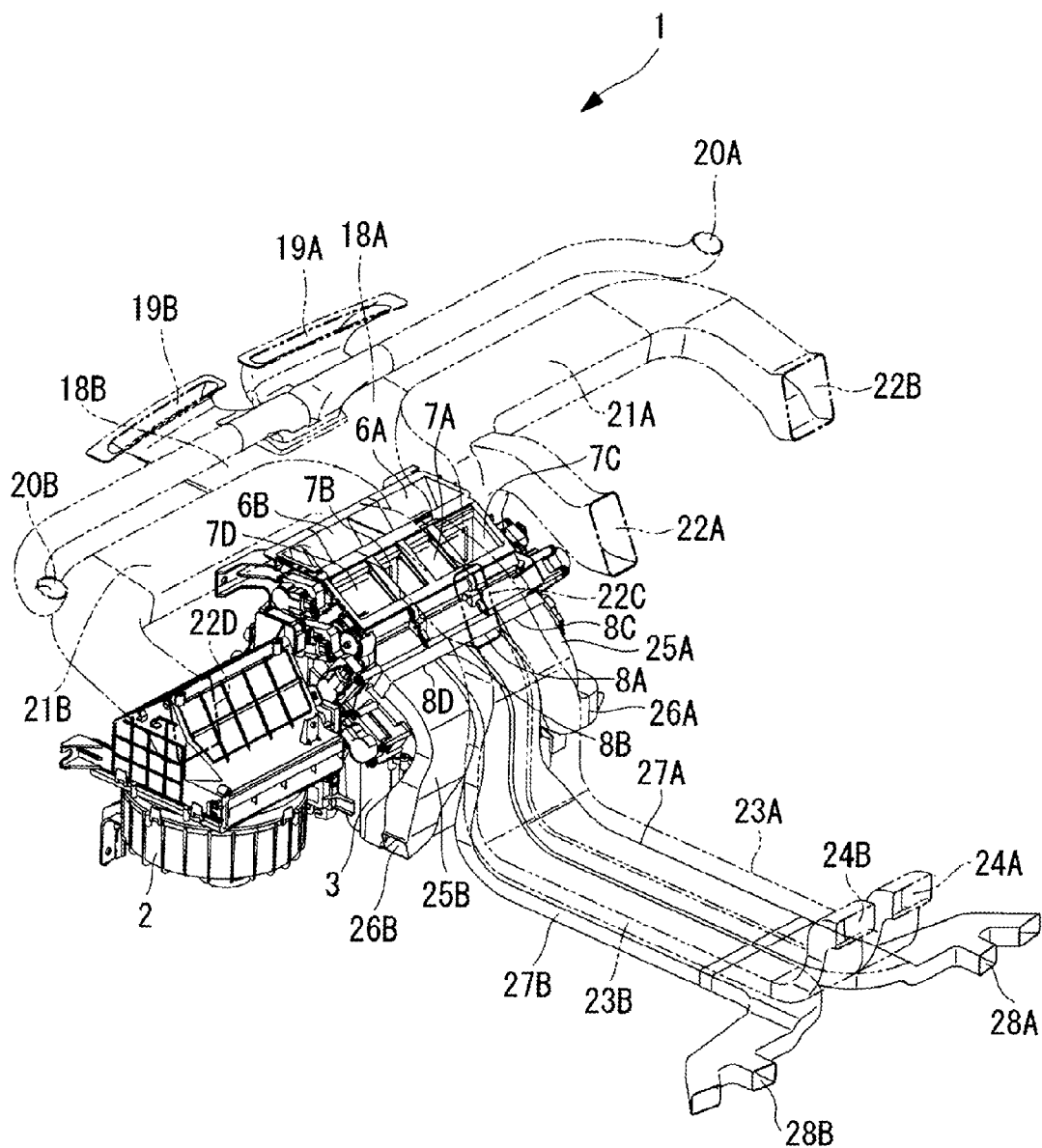
FIG. 2 is a perspective transparent view of part of the vehicle air conditioning apparatus shown in FIG. 1.
Figure 3:
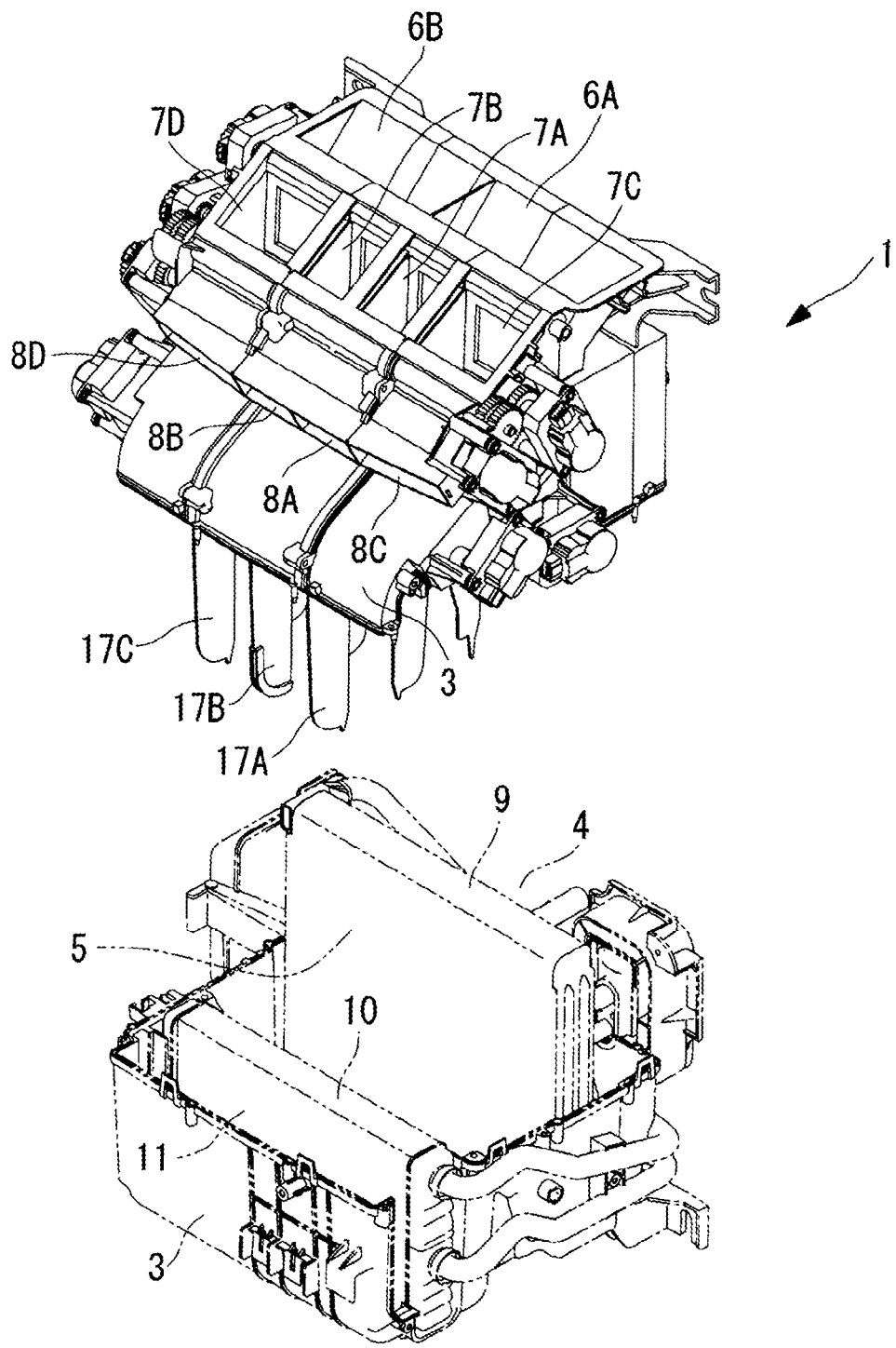
FIG. 3 is an exploded perspective view of a main unit of the vehicle air conditioning apparatus shown in FIG. 1.

As shown in FIGS. 1 and 2, a duct is connected to each of the DEF vent channels 6A and 6B, the face vent channels 7A to 7D, and the foot vent channels 8A to 8D of the HVAC 1 and, as described below, these channels are communicated with vents provided in the vehicle cabin via the ducts. DEF ducts 18A and 18B are connected to the DEF vent channels 6A and 6B, and the DEF ducts 18A and 18B are communicated with two vents 19A and 19B provided at two, that is, left and right, locations for the windshield glass and with two vents 20A and 20B for the side windows.

Front face ducts 21A and 21B are connected to the face vent channels 7C and 7D for the front-seat side, which are disposed at both sides among the four face vent channels 7A to 7D, and these front face ducts 21A and 21B are communicated with center and side face vents 22A and 22B for the driver's seat and with center and side face vents 22C and 22D for the passenger seat. In addition, rear face ducts 23A and 23B are connected to the face vent channels 7A and 7B for the rear-seat side, which are disposed at the center portion among the four face vent channels 7A to 7D, and the rear face ducts 23A and 23B are communicated with the face vents 24A and 24B for the right seat and the left seat at the rear-seat side.

Similarly, front foot ducts 25A and 25B are connected to the foot vent channels 8C and 3D for the front-seat side, which are disposed on both sides among the foot vent channels 8A to 8D, and the front foot ducts 25A and 25B are communicated with the foot vent for the driver's seat and the foot vent for the passenger seat. In addition, the rear foot ducts 27A and 27B are connected to the foot vent channels 8A and 8B for the rear-seat side, which are disposed at the center portions among the foot vent channels 8A to 8D, and the rear foot ducts 27A and 27B are communicated with the foot vents 28A and 28B for the right seat and the left seat at the rear-seat side.

The above-described front face ducts 21A and 21B and the front foot ducts 25A and 25B are disposed so as to extend in the left-right direction and the top-bottom direction directly from the face vent channels 7C and 7D and the foot vent channels 8A to 8D disposed at both side portions of the HVAC 1. Additionally, at intermediate locations thereof, the rear face ducts 23A and 23B and the rear foot ducts 27A and 27B extend, in a vertically stacked state, in the top-bottom direction and the front-rear direction from the face vent channels 7A and 7B and the foot vent channels 8A and 8B disposed at the center positions, and are arranged toward the right seat and the left seat at the rear-seat side.

Figure 5:
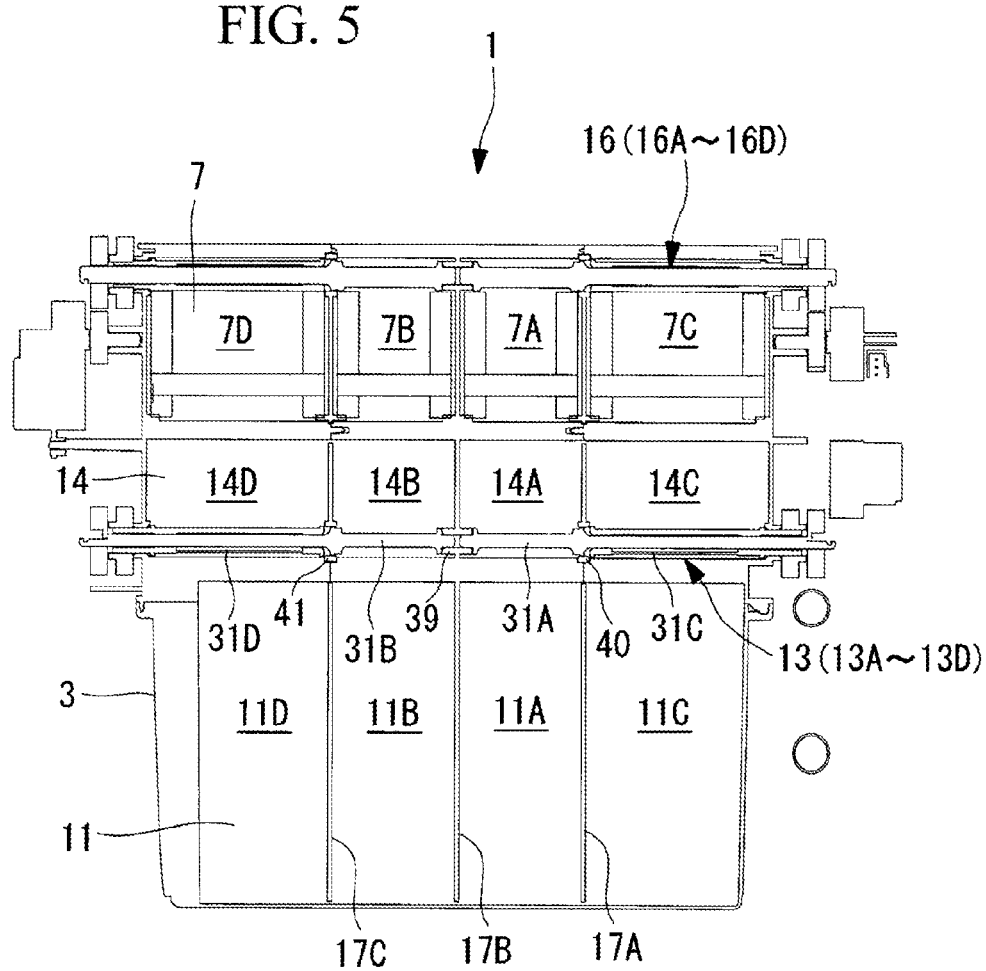
FIG. 5 is a longitudinal cross-sectional view of the vehicle air conditioning apparatus shown in FIG. 1 at an air-mixing-damper shaft position in a direction perpendicular to the airflow direction.
Figure 6A:
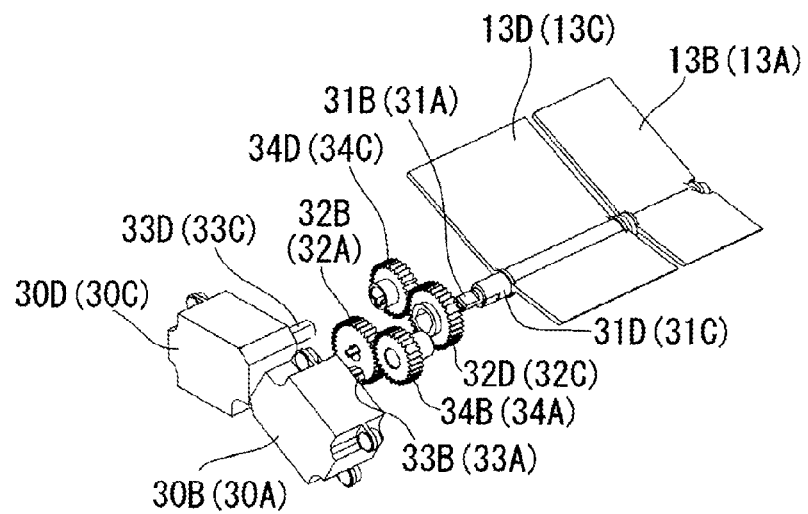
FIG. 6A is a perspective view of a drive mechanism of the air-mixing damper shown in FIG. 5.
Figure 6B:
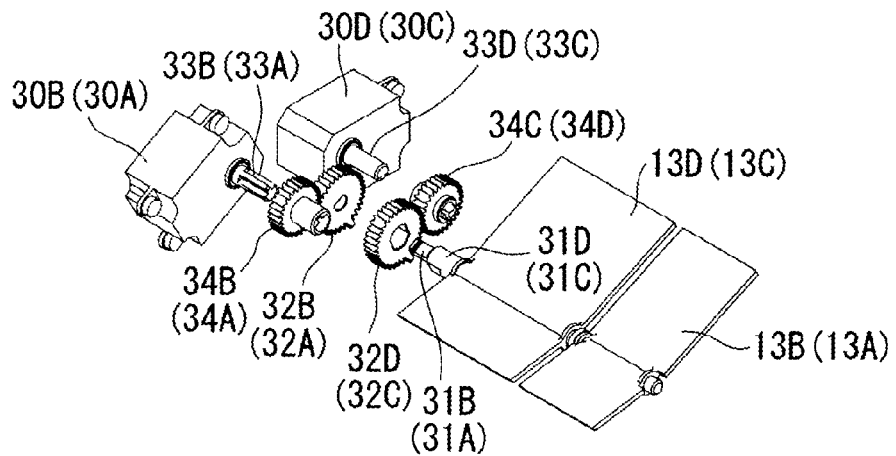
FIG. 6B is a perspective view of the drive mechanism of the air-mixing damper shown in FIG. 5.
Figure 6C:
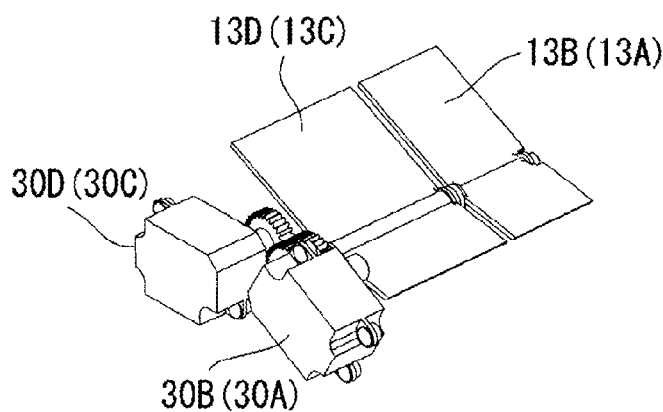
FIG. 6C is a perspective view of the drive mechanism of the air-mixing damper shown in FIG. 5.
Figure 6D:
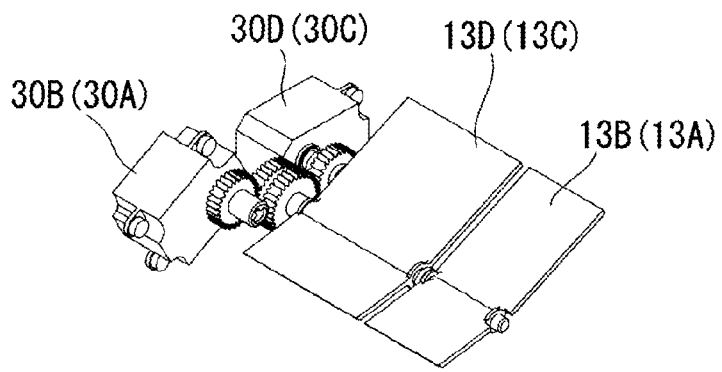
FIG. 6D is a perspective view of the drive mechanism of the air-mixing damper shown in FIG. 5.

Furthermore, as shown in FIG. 5, the air mixing dampers 13A to 13D provided in correspondence with the four channels are installed so that they can be independently driven on the same axis. As shown in FIGS. 6A to 6D, the air mixing dampers 13A and 13D provided in correspondence with the two air channels 5A and 5C on the right side among the four partitioned channels are driven by actuators (drive sources) 30A and 30C installed at a right side surface of the unit casing 3, and the air mixing dampers 13B and 13D provided in correspondence with the two air channels 5B and 5D on the left side are driven by actuators (drive sources) 30B and 30D installed at a left side surface of the unit casing 3.

Drive shafts that drive these air mixing dampers 13A and 13C and the air mixing dampers 13B and 13D have a double-shaft structure, as described below. That is, drive shafts for the air mixing dampers 13C and 13D, which are the two of the air mixing dampers 13A to 13D on the outer sides, are hollow drive shafts 31C and 31D, and solid drive shafts 31A and 31B for the two air mixing dampers 13A and 13B at the center pass through inside the hollow drive shafts 31C and 31D. Note that, in the present invention, the solid drive shafts 31A and 31B refer to the shafts that pass through hollow portions of the hollow drive shaft 31C and 31D, and the shafts themselves may be solid shafts or hollow shafts.

As shown in FIG. 5, these solid drive shafts 31A and 31B and the hollow drive shafts 31C and 31D are supported in a freely rotatable manner by the left and right surfaces of the unit casing 3 and the partitioning plates 17A, 17B, and 17C, and the outer end of each shaft protrudes outward from the left and right surfaces of the unit casing 3. The outer ends of the solid drive shafts 31A and 31B and the hollow drive shafts 31C and 31D are provided with gears 32A, 32B, 32C, and 32D, respectively, and gears 34A to 34D provided at output shafts 33A to 33D of the actuators 30A to 30D that are installed at the left and right surfaces of the unit casing 3 are engaged with these gears 32A to 32D, thereby making it possible to independently drive the solid drive shafts 31A and 31B and the hollow drive shafts 31C and 31D.

Figure 7:
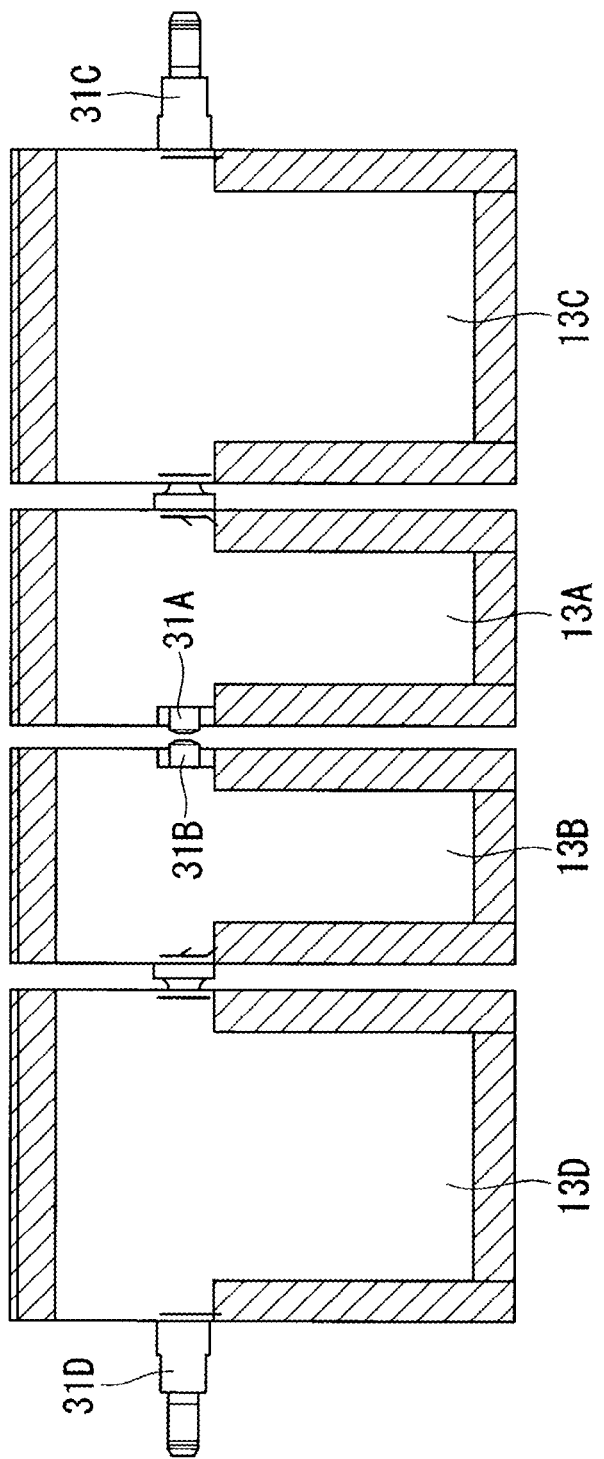
FIG. 7 is a front view in which only the air-mixing damper shown in FIG. 5 is extracted.
Figure 8:
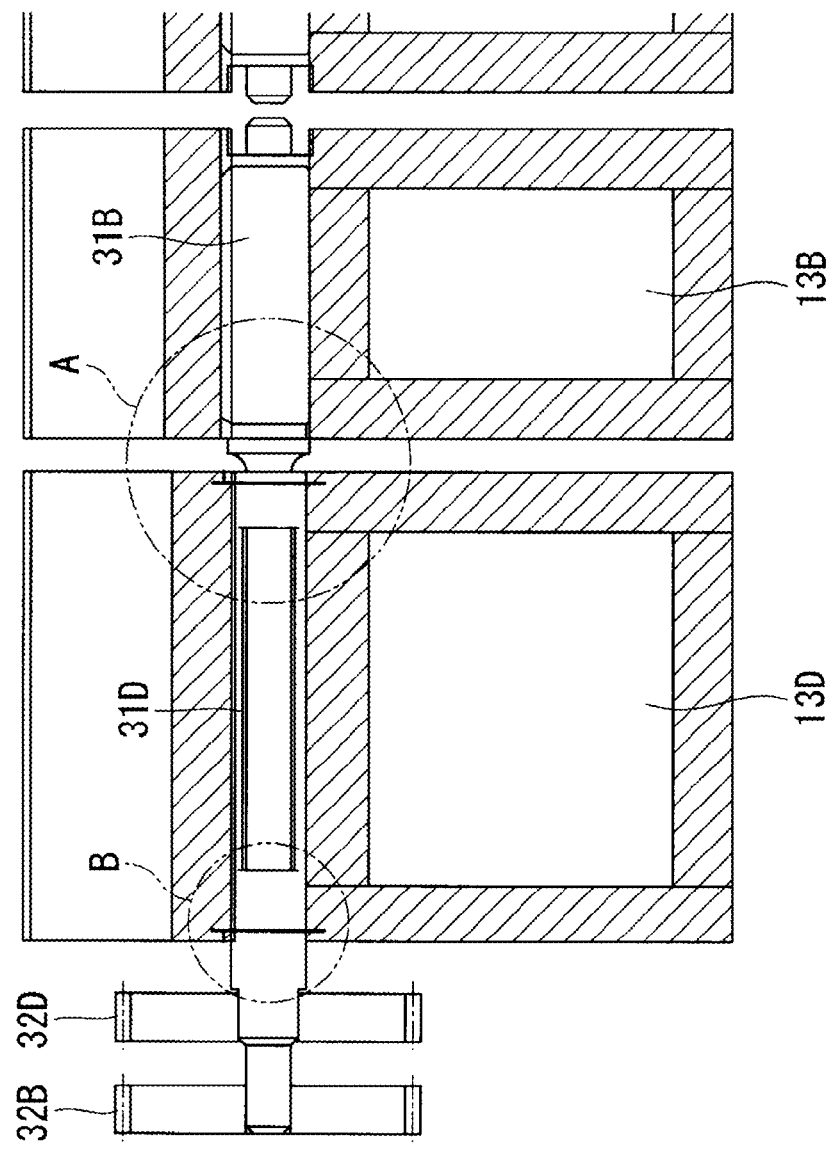
FIG. 8 is an enlarged front view of air-mixing dampers constituting the left-side pair of air-mixing dampers shown in FIG. 7.

FIG. 7 shows a front view of a state in which only the air mixing dampers 13A, 13B, 13C, and 13D are extracted, and FIG. 8 shows an enlarged front view of a pair of the air mixing dampers 13B and 13D that are driven by the drive shaft having the double-shaft structure. The drive shaft of the air mixing damper 13B (13A) disposed on the inner side thereof is the solid drive shaft 31B (31A), and this solid drive shaft 31B (31A) passes through inside the hollow drive shaft 31D (31C) of the air mixing damper 13D (13C) disposed on the outer side. The outer ends of the solid drive shaft 31B (31A) and the hollow drive shaft 31D (31C) protrude outward from the side surfaces of the unit casing 3.

Figure 9:
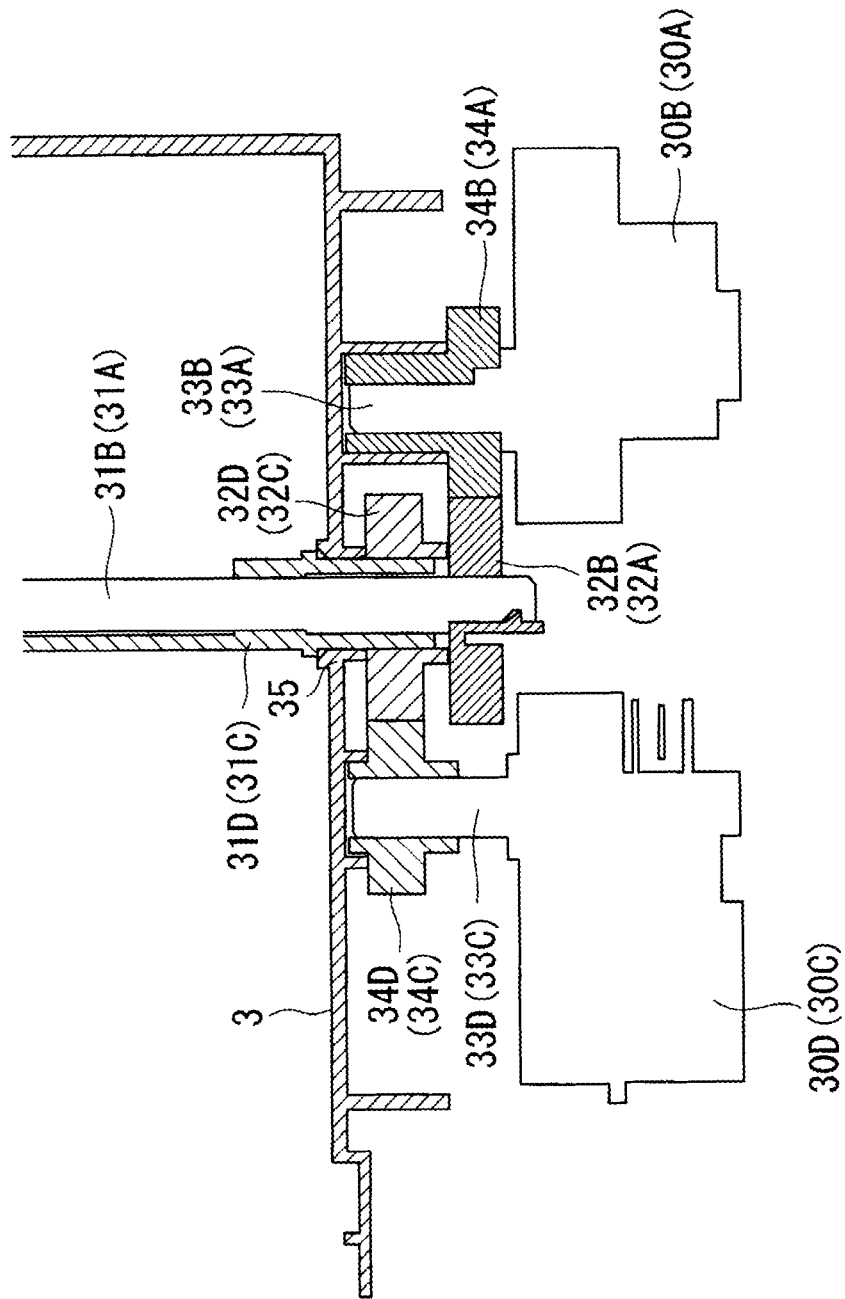
FIG. 9 is a lateral cross-sectional view of the vehicle air conditioning apparatus shown in FIG. 1 at a position of a casing that supports a shaft end of the air-mixing-damper drive shaft.
Figure 10A:
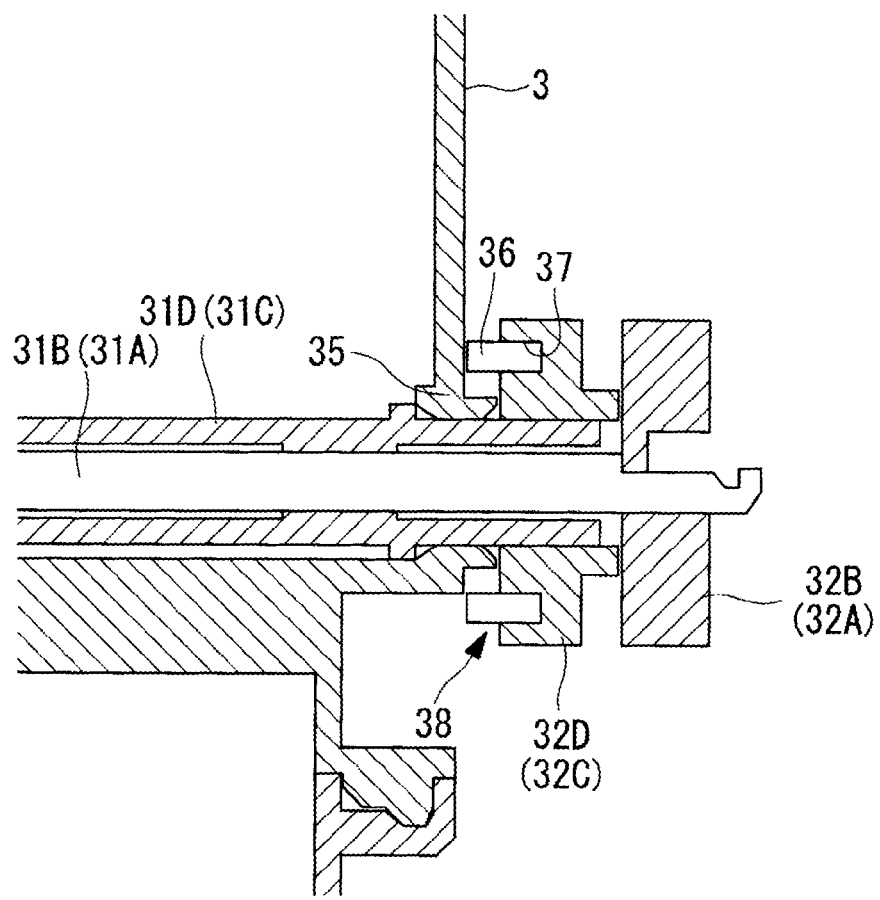
FIG. 10A is a longitudinal cross-sectional view at an axial line position of the air-mixing-damper drive shaft shown in FIG. 9.
Figure 10B:
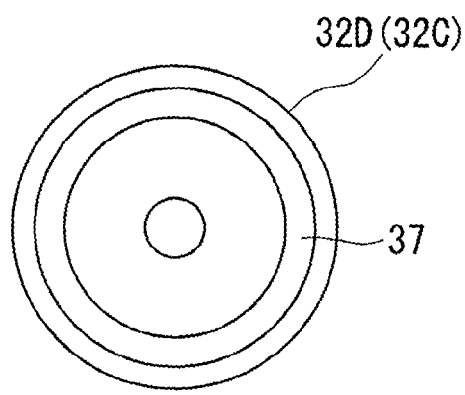
FIG. 10B is a front view of a drive gear shown in FIG. 10A.

As shown in FIGS. 9 and 10, at the outer ends of the solid drive shaft 31B (31A) and the hollow drive shaft 31D (31C), the hollow drive shaft 31D (31C) is supported in a freely rotatable manner at the end of the shaft by a bearing portion 35 formed at the side surface of the unit casing 3, and the outer circumferential surface of the solid drive shaft 31B (31A) is supported by the inner circumferential surface of the hollow drive shaft 31D (31C) in a freely rotatable manner. As described above, the gears 32A to 32D are provided at the outer ends of the solid drive shaft 31B (31A) and the hollow drive shaft 31D (31C), and the gears 34A and 34D provided at the output shafts 33A to 33D of the actuators 30A to 30D that are securely installed at the side surfaces of the unit casing 3 are engaged with the gears 32A to 32D.

Here, when driving the air mixing dampers 13A to 13D with the actuators 30A to 30D, a motive-force transmitting force is exerted in tangential directions at engaging portions between the gears 32A to 32D and the gears 34A to 34D. Because of this, clearances are formed between the solid drive shafts 31A and 31B and the hollow drive shafts 31C and 31D and, at bearing portions thereof, bearing clearances also exist, causing the shaft centers of the individual drive shafts 31A to 31D to shift, and this adversely affects the temperature-adjusting performance of the air mixing dampers 13A to 13D. As shown in FIG. 10A, FIG. 10B, and FIGS. 11A to 11C, in order to prevent this shifting of the shaft centers, a first shaft-center immobilizing mechanism 38 that is formed of a guide member 36 provided at the side surface of the unit casing 3 and a ring groove 37 provided at a side surface of the gear 32D (32C), to which the guide member 36 is fitted in a freely slidable manner, and that secures the shaft center of the hollow drive shaft 31C, 31D is provided.

As shown in FIG. 11A, the guide member 36 may be configured with a ring-like guide member 36A or may be configured of a guide member 33B formed of three-point pins disposed on a circumference thereof at positions that divide it into equal portions or a guide member 35C formed of two-point pins, as shown in FIG. 11B or FIG. 11C. In addition, the guide member 36 and the ring groove 37 may have configuration, the reverse of the above-described configuration, in which the guide member 36 is provided on the side surface of the gear 32D (32C) and the ring groove 37 is provided at the side surface of the unit casing 3. Furthermore, the guide member 36 and the ring groove 37 may be formed by integrally molding them with the unit casing 3 and/or the gear 32D (32C) or may be formed of separate parts formed of materials with low coefficients of friction.

Figure 12:
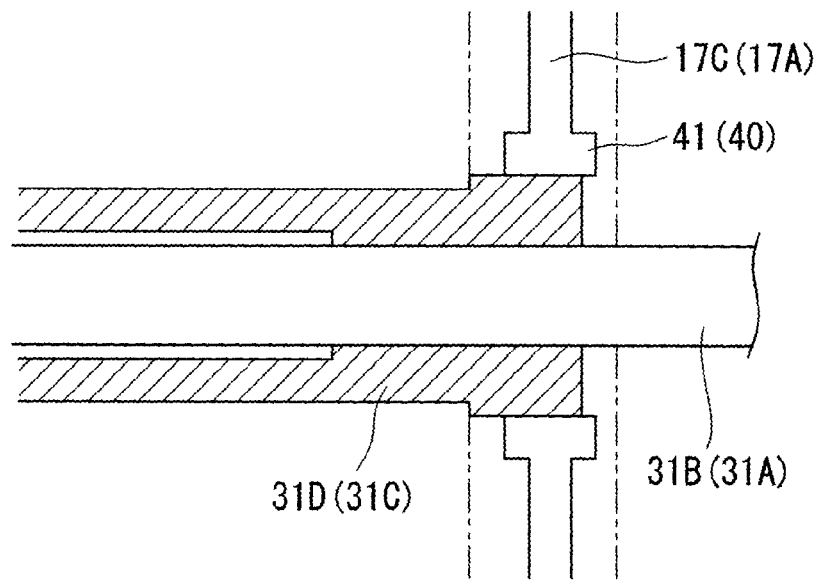
FIG. 12 is a cross-sectional view of a bearing portion of a partitioning plate that supports, in a freely pivotable manner, a drive shaft of the air-mixing damper having a double shaft structure shown in FIG. 8 at a position of a portion A in FIG. 8.

On the other hand, other ends of the solid drive shaft 31B (31A) and the hollow drive shaft 31D (31C), in other words, inner ends thereof, are supported in a freely rotatable Manner by bearing portions 39, 40, and 41 provided at the partitioning plates 17A to 17C as shown in FIG. 5. That is, the bearing portion 39 is provided at the partitioning plate 17B at the center portion, and the shaft ends at the inner ends of the solid drive shafts 31A and 31B, which form a left and right pair, are supported in a freely rotatable manner via the bearing 39. In addition, as shown in FIG. 12, the partitioning plates 17A and 17C on both sides are provided with the bearing portion 41 (40), and the outer circumference of the shaft end at the inner end of the hollow drive shaft 31D (31C), which constitute a left and right pair, is individually supported in a freely rotatable manner by the bearing portion 41 (40). Finally, the inner circumference at the inner end of the hollow drive shaft 31D (31C) is supported in a freely rotatable manner by the outer circumference of the solid drive shaft 31B (31A).

With the above-described configuration, this embodiment affords the following advantages.

Air sent to the HVAC 1 from the blower unit 2 is cooled and/or heated by the evaporator 9 and/or the heater core 10 while circulating in the air channel 5 in the unit casing 3, and, furthermore, the ratio thereof is adjusted via the air mixing dampers 13A to 13D, thereby achieving temperature adjustment to a target blowout temperature.

This air-conditioned air is selectively circulated to any of the DEF vent channels 6A and 6B, the face vent channels 7A to 7D, and the foot vent channels 8A to 8D by the DEF/face dampers 15A to 15D and the foot dampers 16A to 16D that are opened and closed in accordance with the blowout modes and is blown out to the vehicle cabin from any of the vents 19A, 19B, 20A, 20B, 22A, 22B, 22C, 22D, 24A, 24B, 26A, 26B, 29A, and 28B via the ducts 18A, 18B, 21A, 21B, 23A, 23B, 25A, 25B, 27A, and 27B connected to the individual channels.

In other words, in the DEF mode, the air-conditioned air is blown out toward the windshield glass and the side windows from the vents 19A, 19B, 20A, and 20B via the ducts 18A and 18B, and in the face mode, the air-conditioned air is blown out toward occupants in the driver's seat and the passenger seat from the face vents 22A, 22B, 22C, and 22D via the front face ducts 21A and 21B and is also blown out toward occupants in the right seat and the left seat at the rear-seat side from the face vents 24A and 24B via the rear face ducts 23A and 23B. In addition, in the foot mode, the air-conditioned air is blown out toward the feet of the occupants in the driver's seat and the passenger seat from the foot vents 26A and 26B via the front foot ducts 25A and 25B and is also blown out toward the feet of the occupants in the right seat and the left seat at the rear-seat side from the foot vents 28A and 28B via the rear foot ducts 27A and 27B.

Furthermore, in the bi-level mode, the air-conditioned air is blown out from both the face vents 22A, 22B, 22C, and 22D and the foot vents 26A and 26B at the front-seat side via the individual ducts and is blown out from both the face vents 24A and 24B and the foot vents 28A and 28B at the rear-seat side. In addition, in the DEF/foot mode, the air-conditioned air is blown out from both the outlets 19A, 19B, 20A, and 20B directed toward the windshield glass and the side windows and the foot vents 26A, 26B, 28A, and 28B directed toward the feet of the occupants As described above, with this embodiment, the air channel 5 on the downstream side of the evaporator 9 is divided into four channels 5A to 5D with the three partitioning plates 17A, 17B, and 17C, and, via the air mixing dampers 13A to 13D disposed in these four channels, the air-conditioned air that has been adjusted to preferred temperatures can be blown into the vehicle cabin from the face vents 22A to 22D, 24A, and 24B and the foot vents 26A, 26B, 28A, and 28B provided in correspondence with the four seats, that is, the driver's seat and the passenger seat at the front-seat side and the right seat and the left seat at the rear-seat side. Accordingly, a multi-zone type vehicle air conditioning apparatus (HVAC) 1 that is capable of performing separate air conditioning for the four seats can be obtained.

In addition, for the drive shafts having the double-shaft structure that drive the air mixing dampers 13A to 13D provided in the four air channels 5A to 5D in an independently drivable manner, the first shaft-center immobilizing mechanisms 38 that secure the shaft centers of the hollow drive shafts 31C and 31D are provided between the side surfaces of the unit casing 3 that supports the drive shafts in a freely rotatable manner and the gears 32C and 32D provided at the shaft ends of the hollow drive shafts 31C and 31D, and shifting of the shaft centers of the hollow drive shafts 31C and 31D is prevented by securedly Supporting the shaft centers of the hollow drive shafts 31C and 31D to the unit casing 3 via the first shaft-center immobilizing mechanisms 38.

Accordingly, rotational errors and mutual interference of the drive shafts due to rattling of the air mixing dampers 13A to 13D and associated deterioration in temperature control performance, an increase in driving torque, etc. can be prevented; size reduction and cost reduction of the actuators 30A to 30D for driving the dampers can be achieved; and the controllability of the air mixing dampers 13A to 13D can be improved.

In addition, the first shaft-center immobilizing mechanism 38 is formed of the guide member 36 provided at one of the side surface of the unit casing 3 and the side surface of the gear 32C, 32D and the ring groove 27 provided at the other one, to which the guide member 36 is fitted in a freely slidable manner, and, by restraining the position of the gear 32C, 32D by fitting the guide member 36 provided at one of the side surface of the unit casing 3 and the side surface of the gear 32C, 32D to the ring groove 37 provided at the other one, shifting of the shaft center of the hollow drive shaft 31C, 31D is prevented via the gear 32C, 32D. Accordingly, merely by providing the guide member 36 and the ring groove 37, the rotational errors and mutual interference of the drive shafts due to rattling and the associated deterioration in temperature control performance, an increase in driving torque, etc. can be easily and reliably prevented as described above.

In addition, because the above-described guide member 36 and/or the ring groove 37 are/is integrally molded at the side surface of the unit casing 3 and/or the side surface of the gear 32C, 32D, the first shaft-center immobilizing mechanism 38 that secures the shaft center of the hollow drive shaft 31C, 32D can be easily formed by modifying the existing parts without adding new parts. Therefore, it is possible to prevent an increase in costs caused by providing the first shaft-center immobilizing mechanism 38.

Furthermore, in this embodiment, the bearing portion 40, 41 at the partitioning plate 17A, 17C that supports the drive shaft having the double-shaft structure described above in a freely rotatable manner is configured so as to support the shaft end of the hollow drive shaft 31C, 31D. Accordingly, the shaft end at the inner end of the hollow drive shaft 31C, 31D can be supported by the bearing portion 40, 41 and the solid drive shaft 31A, 31B inside the hollow drive shaft 31C, 31D can be supported via the hollow drive shaft 31C, 31D. Therefore, it is also possible to prevent shifting of the shaft centers at inner end of the hollow drive shaft 31C, 31D and the solid drive shaft 31A, 31B having the double-shaft structure, and rotational errors of the drive shaft having the double shaft structure and mutual interference of the drive shaft and the associated increase in driving torque, etc. can be prevented; size reduction and cost reduction of the actuators 30A to 30D for driving the dampers can be achieved; and the controllability of the air mixing dampers 13A to 13D can also be improved.

Second Embodiment

Next, a second embodiment of the present invention will be described using FIG. 13.

This embodiment differs from the first embodiment described above in that second shaft-center immobilizing mechanisms 42 that prevent shifting of shaft centers of the solid drive shafts 31A and 31B are provided at the outer ends thereof. Because other components are the same as those in the first embodiment, descriptions thereof will be omitted.

Figure 13A:
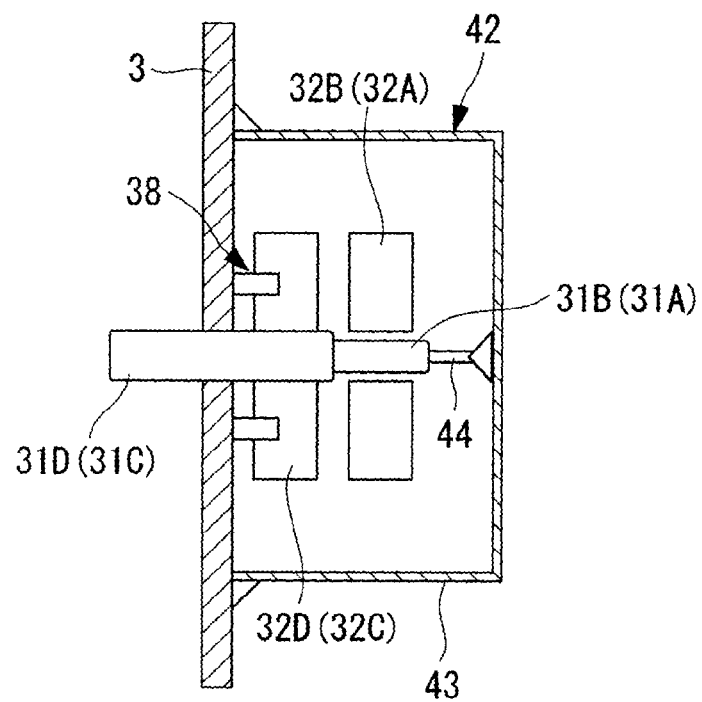
FIG. 13A is a longitudinal cross-sectional view of a vehicle air conditioning apparatus according to a second embodiment of the present invention at a shaft end position of an air-mixing-damper drive shaft.
Figure 13B:
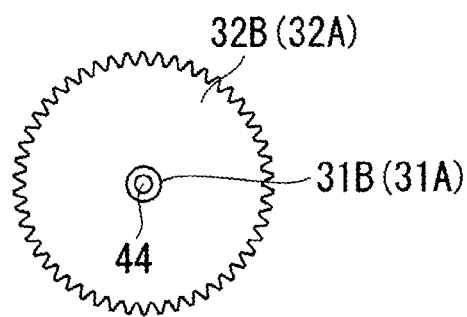
FIG. 13B is a front view of a drive gear shown in FIG. 13A.

As shown in FIG. 13, this embodiment has a configuration provided with the second shaft-center immobilizing mechanism 42 that prevents shifting of the shaft center of the solid drive shaft 31B (31A) by securing the shaft center thereof at the outer end of the solid drive shaft 31B (31A).

The second shaft-center immobilizing mechanism 42 is provided between the side surface of the unit casing 3 and the shaft end at the outer end of the solid drive shaft 31B (31A), and is formed of a support member 43 that is securedly installed at the side surface of the unit casing 3 and a securing guide 44 that is provided in the support member 43 and that supports the shaft center of the solid drive shaft 31B (31A). Note that the securing guide 44 may be configured so as to support a hole provided at the center of the shaft end of the solid drive shaft 31B (31A) by being fitted thereto or may be configured so as to support the outer circumference of the shaft end. In addition, the securing guide 44 may be integrally molded with the support member 43 or may be provided as a separate part.

With this embodiment, for the drive shafts having the double-shaft structure that drive the air mixing dampers 13A to 13D, the second shaft-center immobilizing mechanism 42 that is formed of the support member 43 securedly installed at the side surface of the unit casing 3 and the securing guide 44 provided in the support member 43, which supports the shaft center of the solid drive shaft 31B (31A), and that secures the shaft center of the solid drive shaft 31B (31A) is provided between the side surface of the unit casing 3 where the drive shafts are supported in a freely rotatable manner and the shaft end of the solid drive shaft 31B (31A); therefore, the shaft center of the solid drive shaft 31B (31A) can be securedly supported at the unit casing 3 via the second shaft-center immobilizing mechanism 42, and, accordingly, shifting of shaft center of the solid drive shaft 31B (31A) can be prevented.

Therefore, the rotational errors and mutual interference of the drive shafts due to rattling of the air mixing dampers 13A to 13D and the associated deterioration in temperature control performance, an increase in driving torque, etc. can be prevented; size reduction and cost reduction of the actuators 30A to 30D for driving the dampers can be achieved; and the controllability of the air-mixing dampers 13A to 13D can also be improved. In addition, the second shaft-center immobilizing mechanism 42 that supports and restrains the shaft center of the solid drive shaft 31B (31A) and that prevents shifting of the shaft center thereof can be configured only with the support member 43 and the securing guide 44 in a simple manner at low cost, and, by doing so, rotational errors and mutual interference of the drive shafts due to rattling of the air mixing dampers 13A to 13D based on the clearance between the shafts and gaps at bearing portions and the associated deterioration in temperature control performance, an increase in driving torque, etc. can be prevented, and a performance enhancement can be reliably achieved.

Third Embodiment

Next, a third embodiment of the present invention will be described using FIG. 14.

In this embodiment, support structures between the solid drive shafts 31A and 31B and the hollow drive shafts 31C and 31D, which constitute the double-shaft structure, differ from those in the first and second embodiments described above. Because other components are the same as those in the first and second embodiments, descriptions thereof will be omitted.

Figure 14:
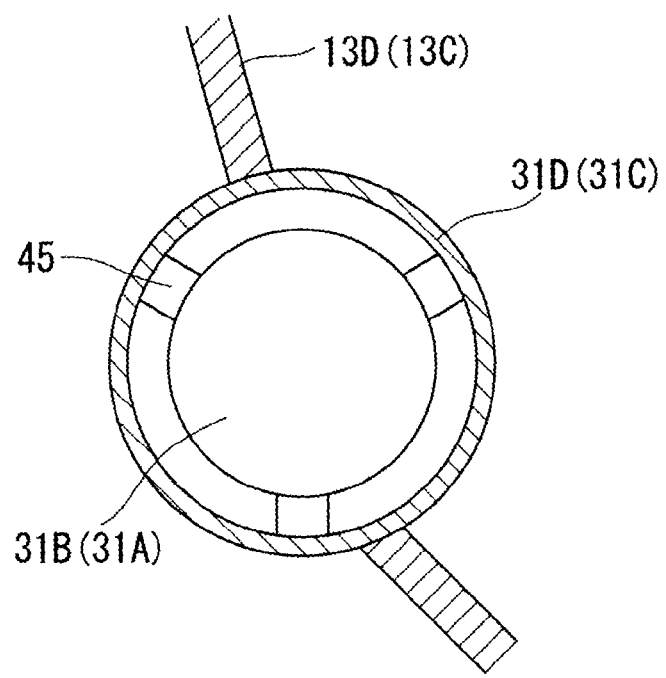
FIG. 14 is a longitudinal cross-sectional view of a vehicle air conditioning apparatus according to a third embodiment of the present invention at a portion B in FIG. 8.

In this embodiment, between the solid drive shafts 31A and 31B and the hollow drive shafts 31C and 31D, which constitute drive shafts having the double-shaft structure, ribs 45 are provided at a plurality of locations at the inner circumferences of the hollow drive shafts 31C and 31D, and the outer circumferences of the solid drive shafts 31A and 31B are supported in sliding contact via the ribs 45, as shown in FIG. 14.

The above-described ribs 45 are provided at least three locations on the inner circumferential surfaces of the hollow drive shafts 31C and 31D in arrangements that divide the circumferences thereof into equal portions. Note that the ribs 45 are integrally molded on the hollow drive shafts 31C and 31D; however, they may be integrally molded on the outer circumferential surfaces of the solid drive shafts 31A and 31B so as to support the hollow drive shafts 31C and 31D at the inner circumferences thereof in sliding contact.

As described above, with this embodiment, the solid drive shafts 31A and 31B and the hollow drive shafts 31C and 31D, which constitute the double-shaft structure, are mutually supported in sliding contact via the ribs 45 that are provided at one of the inner circumference of the hollow drive shafts 31A and 31B and the outer circumference of the solid drive shafts 31A and 31B at least three locations; therefore, it is possible to reduce rattling by reducing the clearances between the shafts, and it is also possible to reduce sliding-contact friction. Therefore, the controllability of the air mixing dampers 13A to 13D can be further improved and the driving torque thereof can also be reduced.

Note that the present invention is not limited to the inventions according to the embodiments described above, and appropriate modifications are possible within a range that does not depart from the gist thereof. For example, although a description has been given of an example in which the air channel at the downstream side of the evaporator is divided into four channels 5A to 5D and the four air mixing dampers 13A to 13D, which are independently driven, are installed at the individual channels, naturally, the present invention is similarly applicable to an HVAC configured to independently adjust the temperature at the two seats, that is, the driver's seat and the passenger seat, at the front-seat side, an HVAC configured to adjust the temperature of the air-conditioned air for the two seats at the front-seat side and the air-conditioned air for the two seats at the rear-seat side in separate regions in a single unit, and so on.

REFERENCE SIGNS LIST 1 vehicle air conditioning apparatus (HVAC)
3 unit casing
5, 5A, 5B, 5C, 5D air channel
9 evaporator
10 heater
11, 11A, 11B, 11C, 11D heating channel
12, 12A, 12B, 12C, 12D bypass channel
13, 13A, 13B, 13C, 13D air mixing damper
17A, 17B, 17C partitioning plate
31A, 31B solid drive shaft
31C, 31D hollow drive shaft
32A, 32B, 32C, 32D gear
36, 36A, 36B, 36C guide member
37 ring groove
38 first shaft-enter immobilizing mechanism
39, 40, 41 bearing
42 second shaft-center immobilizing mechanism
43 support member
44 securing guide
45 rib

The invention claimed is:

1. A vehicle air conditioning apparatus in which a plurality of air mixing dampers that are driven independently of each other and that adjust the ratio of airflow volume circulated in a channel that bypasses a heater and a heating channel that flows via the heater are provided in a plurality of air channels partitioned by a plurality of partitioning plates downstream of an evaporator, wherein the air mixing dampers have a drive shaft having a double-shaft structure, in which a hollow drive shaft of one damper is penetrated by a solid drive shaft of another damper, and the air mixing dampers can be individually driven via a gear provided at a shaft end of each drive shaft, the vehicle air conditioning apparatus comprising:

a unit casing to which the drive shaft having the double-shaft structure is supported in a freely rotatable manner; and a first shaft-center immobilizing mechanism that is provided at an outer side of the unit casing and that secures a shaft center of the hollow drive shaft, wherein the first shaft-center immobilizing mechanism is provided between an outer side surface of the unit casing and the gear provided at the shaft end at an outer end of the hollow drive shaft, the shaft end at an outer end of the hollow drive shaft protruding outward from the outer side surface of the unit casing, wherein the shaft end at an inner end of the solid drive shaft is supported in a freely rotatable manner by a bearing portion provided at a first partitioning plate of the plurality of partitioning plates, and an outer circumference of the shaft end at an inner end of the hollow drive shaft is supported in a freely rotatable manner by a bearing portion provided at a partitioning plate of the plurality of partitioning plates other than the first partitioning plate, and wherein an inner circumference at the inner end of the hollow drive shaft is supported in a freely rotatable manner by an outer circumference of the solid drive shaft.

2. The vehicle air conditioning apparatus according to claim 1, wherein the first shaft-center immobilizing mechanism is formed of a guide member, which is provided at one of the outer side surface of the unit casing and a side surface of the gear facing the unit casing, and a ring groove provided at the other, to which the guide member is fitted in a freely slidable manner.

3. The vehicle air conditioning apparatus according to claim 2, wherein the guide member and/or the ring groove are/is integrally molded on the side surface of the unit casing and/or the side surface of the gear.

4. The vehicle air conditioning apparatus according to claim 1, wherein the drive shaft having the double-shaft structure is mutually supported in sliding contact via ribs provided at least three locations at an inner circumference of the hollow drive shaft or an outer circumference of the solid drive shaft.

* * * * *